Dec. 6, 1966 D. L. THOMAS 3,290,136
APPARATUS FOR PRESS BENDING GLASS SHEETS
Filed Dec. 8, 1965
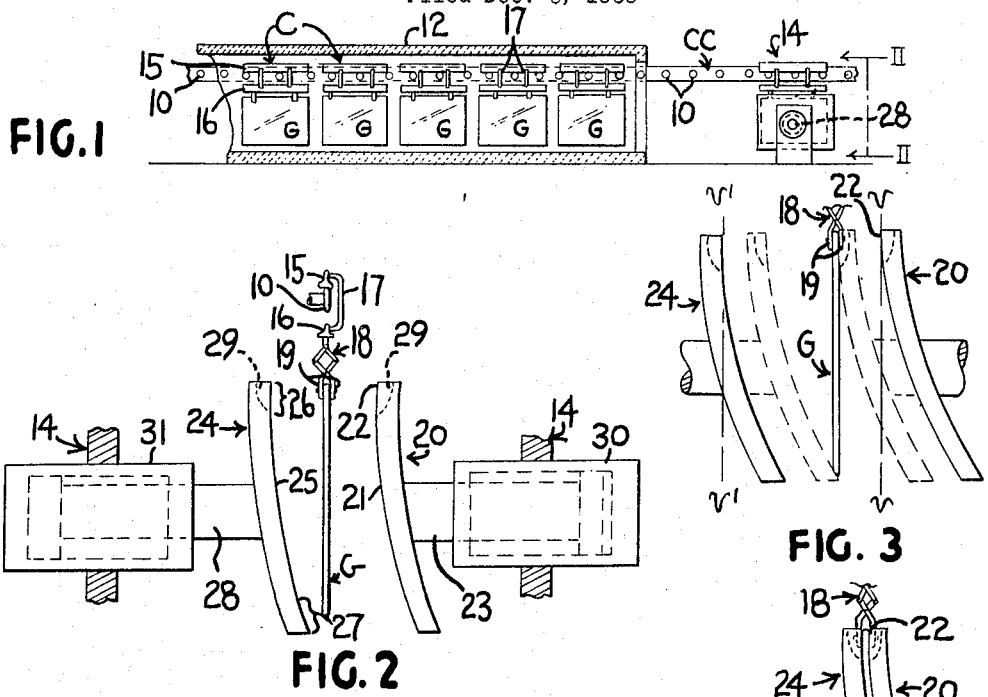
INVENTOR
DEAN L. THOMAS
BY
ATTORNEYS United States Patent Office 3,290,136
Patented Dec. 6, 1966

3,290,136
APPARATUS FOR PRESS BENDING GLASS SHEETS
Dean L. Thomas, Crestline, Ohio, assignor to Pittsburgh Plate Glass Company, Pittsburgh, Pa., a corporation of Pennsylvania
Filed Dec. 8, 1965, Ser. No. 512,500
4 Claims. (Cl. 65—275)

The present application is a continuation-in-part of application Serial No. 348,373, filed March 2, 1964 for Shaping Glass, now abandoned. The latter, in turn, is a continuation-in-part of application Serial No. 113,853, for Shaping Glass, filed May 31, 1961, now forfeited, and a continuation-in-part of application Serial No. 132,097, filed August 17, 1961, now abandoned. All of the aforesaid applications are assigned to the assignee of the present application.

The present invention relates to treating glass and particularly refers to improvements in shaping glass sheets wherein a heat-softened glass sheet is supported in a substantially vertical plane in spaced relation between two complementary shaping members and is shaped by being sandwiched throughout substantially its entire extent between said shaping members while in a plastic condition.

Flat glass sheets are shaped successively by heat-softening followed by sandwiching the major surfaces of each heat-softened glass sheet between a pair of glass shaping members having complementary convex and concave shaping surfaces opposing one another. During a typical operation, the glass sheets are gripped near their upper edges by tongs. The latter are suspended from carriages which are conveyed along a horizontal path of a conveyor that extends through a furnace and a glass shaping station.

During the heating that softens the glass before it is shaped, the tongs provide a pair of gripping forces opposing one another through the thickness of the glass sheet. Each glass sheet is suspended in a vertical plane from the tongs. Normally more than one set of tongs is needed to support a flat glass sheet.

Each pair of tongs exerts a pull in a substantially vertical direction at each glass gripping region gripped by a pair of tongs. When the glass sheet is heat-softened, its low viscosity at elevated temperatures permits the glass to distort in the vicinity of each gripping region and form a convex bump in the upper edge of the supported glass sheet. The effect of this pulling is minimized when the proportion of the glass weight borne by each pair of tongs is minimized.

An optimum condition is obtained when the number of tongs used is increased and an equal portion of the glass weight is borne by each pair of tongs. However, the complexity of loading a glass sheet increases with the number of pairs of tongs used. Therefore, a compromise is usually made to limit the number of pairs of tongs used to the minimum needed to support the glass sheet and obtain an upper edge distortion within acceptable tolerance.

When the prior art techniques for gripping a flat glass sheet by a plurality of tongs are employed for tempering flat glass sheets, the defects due to kinking and pulling are reduced substantially. However, when the flat glass sheets are shaped into curved configurations, the prior art criteria for suspending flat glass sheets properly are insufficient to avoid this defect.

Since the gripping force applied to the heat-softened glass sheet by the glass shaping members is much greater than that applied through the tongs, and the gripping members of the tongs are pivoted about an overhead axis defined by a structural member from which the tongs are suspended, the gripping members of the tongs tend to pivot upwardly while the softened glass sheet is sandwiched throughout substantially its entire extent between the glass shaping members. Therefore, prior art tongs tend to kink the softened glass because the axis between the glass gripping members (or tong points, as they are called in the prior art) deviate from the original direction normal to the major flat glass surfaces by an amount dependent upon the severity of bend imparted to the glass sheet.

In prior art devices, the shaping members were moved along parallel axes normal to the vertical plane which the flat glass sheet occupied while gripped by the tongs during its heating. Many glass sheets shaped while gripped by tongs were rejected because of vents originating at the tong marks. Many other fabricated products were rejected because their upper edges formed a rounded contour immediately above the regions gripped by the tongs.

The present invention suggests several solutions to reduce stress in glass sheets while undergoing press bending. The various aspects of the present invention enumerated below may be used singly or in combination with one another as required, depending on the size and shape of the product to be fabricated.

One cause of kinking resulting from shaping the glass about a horizontal axis arises from the fact that the tongs apply a kinking force to glass sheets when the major surfaces are shaped so that their regions engaged by the tongs are in an oblique plane.

One feature of the present invention suggests avoiding the latter cause of defects of the prior art production methods by tilting the shaping surface of each glass shaping member relative to its axis of movement so that the portion of each complementary shaping surface that is tangent to a vertical plane lies toward the upper edge of the shaping surface. The present invention envisions the location of the vertical plane of tangency either at the uppermost portion of each shaping member or somewhere intermediate its upper edge and a horizontal plane passing through the center of the shaping member. These criteria are particularly important when the bending curve has a non-uniform radius of curvature about a horizontal axis.

Another embodiment of the present invention suggests employing a novel program for moving the tilted forming members in a prearranged sequence of motions. A tongs supported, heated glass sheet is suspended in the space between the opposing substantially complementary glass shaping members preparatory to the novel treatment of the present invention.

According to the schedule proposed by the present invention, the shaping members are moved toward the opposite surfaces of the suspended glass sheet in such a manner that the concave shaping member contacts the bottom edge of one surface of the glass sheet and continues to move inwardly until its upper edge portion contacts the upper edge of said one surface of the tongs suspended glass sheet. The additional inward movement of the concave glass shaping member after its bottom edge portion makes initial contact with the sheet tilts the glass sheet and causes the bottom edge of the glass sheet to slide upwardly on the concave shaping surface of the concave shaping member.

The convex glass shaping member remains in spaced relation to the glass sheet while the concave member makes initial contact, first at the bottom edge and subsequently at the upper edge of the glass sheet. At this time further inward motion of the concave member is stopped and the concave shaping member supports the tilted glass sheet. The convex glass shaping member continues to approach the opposite glass sheet surface toward a mating position with the concave glass shaping member. As the convex glass shaping member contacts the opposite surface of the glass sheet, the bottom edge of the glass sheet slides upwardly still further upon the concave shaping surface supporting the bottom edge. This upward sliding compensates somewhat for the reduction in vertical dimension of the glass sheet as it is bent about a horizontal axis of curvature. At the end of the shaping operation, the opposite surfaces of the glass sheet are engaged substantially entirely throughout their extent by the shaping members.

If the curvature desired for the glass sheet is relatively sharp, it may be necessary to move the convex glass shaping member obliquely upwardly into mating position with the concave glass shaping member so as to relieve some of the force tending to remove the glass from gripping engagement by the tongs as described in parent application Serial No. 113, 853, mentioned hereinabove.

The factors of the last aspect of the present invention that are believed to provide improved results compared to those resulting from using prior art techniques are believed to be: (1) tilting the flat glass sheet before it is shaped reduces the vertical distance between the top edge and bottom edge of the glass before it is bent, thereby reducing the shortening of its vertical dimension during bending and minimizing the pull on the glass in the regions gripped by the tongs due to the glass shaping members engaging the glass; (2) the concave shaping member supports a portion of the weight of the tongs supported glass sheet before the convex shaping member engages the opposite surface of the glass sheet, thereby reducing the net effect of the pressurized engagement of the glass shaping members to pull the glass out of gripping engagement by the tongs; and (3) the lower portion of the concave shaping member urges the glass sheet upward from the instant of its initial contact with the lower edge of the glass sheet until the glass sheet is securely sandwiched in pressurized relation between the opposing glass shaping members, thereby relaxing the tongs. This relaxing of the tongs while providing support for the glass sheet makes it unlikely that the gripping force on the glass sheet between the glass shaping members will pull the glass out of the grip between the tongs or will cause distortion in the regions of the glass sheet gripped by the tongs. Instead, movement of the convex shaping member into pressurized contact with the concave shaping member tensions the relaxed tongs.

The reasons enumerated above explain why the techniques suggested by the last aspect of the present invention lessen the incidence of production losses compared to those experienced by prior art techniques involving the simultaneous movement of the glass shaping members toward one another in pressurized engagement with the glass.

The main object of the present invention is to reduce stresses resulting from a press bending operation wherein a glass sheet is supported by a glass supporting member in a vertical plane, heated to its softening point and its major surfaces sandwiched throughout substantially their entire extent between glass shaping members having complementary convex and concave shaping surfaces opposing one another to bend the glass sheet into a shape conforming to said complementary shaping surfaces, wherein the pressure resulting from sandwiching the glass sheet between said glass shaping members causes said glass supporting member to stress the glass sheet.

Specifically, it is an object of one embodiment of the present invention to minimize losses in producing press shaped glass sheets, particularly upper edge distortion and vents due to pulling forces between the glass gripping tongs and the shaping members along a direction parallel to the major glass sheet surfaces and to minimize kinks in press shaped glass sheets due to twisting forces applied by the tongs on the glass sheets.

The above and other objects will be understood better after the reader has studied the description of a typical illustrative embodiment of the invention which follows.

In the drawings which form part of the description of the illustrative embodiment and wherein like reference numerals are applied to like structural elements, FIG. 1 is a fragmentary longitudinal view of a typical furnace and glass shaping station in which the first aspect of the present invention may be employed successfully;

FIG. 2 is a fragmentary transverse view of a glass shaping station taken along the lines II—II of FIG. 1 showing the glass shaping members in retracted position;

FIG. 3 is a fragmentary view similar to that shown in FIG. 2 showing the paths of movement taken by the complementary glass shaping members from their retracted position to a position wherein the tilted shaping members first contact the glass;

FIG. 4 is a fragmentary view showing the glass shaping members of FIG. 3 in their closed position sandwiching the bent glass sheet;

FIG. 5 is a fragmentary view similar to that shown in FIG. 3 showing the relative position of the tilted glass shaping members to the glass at the moment the bottom edge portion of the tilted concave shaping member has moved into contact with the bottom edge of one surface of the glass sheet while the remainder of the concave shaping member and the entire convex shaping member are out of contact with the glass sheet;

FIG. 6 is a fragmentary view similar to that of FIG. 5, showing the innermost position of the concave glass shaping member with its upper edge portion in contact with the upper edge of the glass sheet, illustrating how the glass sheet is tilted by the concave glass shaping member while the convex glass shaping member is still spaced from the glass sheet;

FIG. 7 is a fragmentary view similar to FIG. 6 showing how the convex glass shaping member makes initial contact with the opposite surface of the glass sheet supported in tilted relation by the concave glass shaping member;

FIG. 8 is a fragmentary view similar to those of FIGS. 5 to 7 showing the glass shaping members in their closed position sandwiching the bent glass sheet therebetween and showing in phantom the initial horizontal plane occupied by the bottom edge of the glass sheet after its initial contact depicted in FIG. 4, and after it has been tilted as depicted in FIG. 6; and FIG. 9 is a fragmentary view of a pair of shaping members tilted in accordance with another embodiment of the present invention.

Referring to the drawings, reference number 10 refers to the driving rolls of a carriage conveyor CC for moving carriages C along a horizontal path through the upper portion of a tunnel-like furnace 12 and a glass shaping station 14. Each carriage C is composed of a cast iron alloy and comprises an upper beam 15 that rides on rolls 10 and a lower beam 16 interconnected to the upper beam 15 by a pair of arcuately shaped vertically extending connecting rods 17. The lower beam 16 of each carriage C has suspended therefrom a pair of steel alloy glass gripping tongs 18 which grip a supported glass sheet G at two spaced points along its upper edge. Each tong has a pair of glass gripping elements 19 that apply opposing forces through the glass thickness to hang the glass sheet G therefrom in a vertical plane.

Referring to FIG. 2, the glass shaping station 14 comprises a convex glass shaping member 20 having a convex shaping surface 21 of continuous extent, whose outermost portion is indicated by reference number 22. An actuating piston 23 is mounted to the rear of convex glass shaping member 20 to urge the latter to move along the axis defined by the length of its piston rod toward and away from the vertical plane occupied by the glass sheets G in succession.

At the other side of the vertical plane occupied by the glass sheets, the glass shaping station 14 comprises a concave glass shaping member 24 having a concave shaping surface 25 of continuous extent which conforms to and is substantially complementary to the convex shaping surface 21 of convex glass shaping member 20. The difference in shape between shaping surfaces 21 and 25 permits the insertion of a glass sheet of finite thickness therebetween to be engaged by said shaping surfaces throughout substantially its entire extent.

Reference number 26 refers to the upper edge portion of the concave shaping surface 25, whereas reference number 27 refers to the lower edge portion of the concave shaping surface 25. An actuating piston 28 is mounted to the rear of concave glass shaping member 24 to urge the latter to move along the axis defined by the length of the piston 28.

Glass shaping members 20 and 24 are composed of a rigid heat resistant material such as stainless steel provided with a covering of fiber glass or asbestos or the like at their shaping surfaces. When they are in mating engagement with one another and sandwiching a glass sheet G therebetween throughout substantially its entire extent, clearance must be provided for the tongs 18. These clearances or notched out portions are depicted by reference characters 29.

Pistons 23 and 28 are movably mounted in piston cylinders 30 and 31, respectively, to urge the glass shaping members 20 and 24 toward and away from mating engagement with one another. Piston cylinders 30 and 31 are rigidly attached to the structural support for the glass shaping station 14.

One aspect of the present invention involves tilting the glass shaping members 20 and 24 relative to the pistons 23 and 28, respectively, in such orientations that a tangent to the uppermost portions of the shaping surfaces is substantially parallel to vertical planes. Since the glass shaping members move in rectilinear paths toward and away from the glass sheet during shaping, the orientation of their shaping surfaces does not change during the glass shaping operation. This disposition is depicted by the planes v—v and v'—v' drawn parallel to the upper portions of the retracted glass shaping members in FIG. 3.

By orienting the glass shaping surfaces in the manner indicated hereinabove, commercial operations have improved to the point where the tolerance due to kinking in the vicinity of the tongs was reduced from 1/16 inch to 1/32 inch without any appreciable increase of losses due to failure to meet the more rigid tolerance requirements.

In the past actuating pistons 23 and 28 have been mounted for equal, simultaneous movement toward and away from one another. Still another improvement provided by the present invention involves controlling the movement of the actuating pistons 23 and 28 so that the convex glass shaping member 20 and the concave glass shaping member 24 to which actuating pistons 23 and 28 are operatively connected, respectively, move in a controlled sequence of operations.

According to a specific illustrative embodiment of the latest aspect described herein, the movement of the convex glass shaping member 20 and that of the concave glass shaping member 24 is so controlled that the lower edge portion 27 of the concave shaping surface 25 of the concave glass shaping member 24 initially contacts the bottom edge of glass sheet G occupying a position in horizontal plane x—x. The suspended glass sheet G originally is suspended so that its major surface facing to the left of FIGS. 5 to 8 occupies vertical plane v—v.

The concave glass shaping member 24 continues to move to the limit of its innermost movement depicted by FIG. 6 until its upper edge portion 26, a tangent to which lies in a substantially vertical plane, contacts the upper edge of the left glass sheet surface. Meanwhile, bottom edge portion 27 of concave glass shaping member 24 causes the glass sheet to tilt, thereby lifting the bottom edge of the glass sheet G into horizontal plane y—y.

As the concave member 24 moves inward from the position occupied in FIG. 5 to that of FIG. 6, its bottom edge portion 27 provides a vertical component of force to support a portion of the weight of the tongs suspended glass sheet while the convex shaping surface 21 of shaping member 20 is spaced from the opposite surface of the glass G. Thus, the concave shaping surface 25 of shaping member 24 provides partial support for glass sheet G while the latter awaits initial contact with the convex shaping member 20.

The angle of tilting should be a small acute angle not exceeding 30 degrees. If the glass is tilted through a larger angle, the gravitational force on the tongs tending to return the tongs to a vertical disposition tends to dimple the glass at the regions gripped by the tongs.

The convex glass shaping member continues to move toward a mating position with the concave glass shaping member 24 until the glass shaping members 20 and 24 are in alignment with one another and in pressurized contact with the opposite surfaces of the glass sheet as shown in FIG. 8. Inward movement of the convex shaping member 20 shortens the vertical dimension of the glass sheet when it forms the sheet from a flat to a sharp bend about a horizontal bending axis.

When the glass sheet is bent to a relatively shallow bend, for example, having a radius of curvature of 60 inches or more, and the glass sheet to be bent has a relatively small vertical dimension, for example, 12 inches or less, the tilting of the shaping surfaces of the glass shaping members is substantially sufficient to compensate for the shortening of the vertical dimension of the glass sheet during bending when the glass shaping members are moved in horizontal directions to engage the glass. However, if the glass sheet G is to be bent to a sharper curvature and/or if the vertical dimension of the glass sheet is more than about 12 inches, it becomes desirable to move the complementary pressing members in an oblique upward direction toward one another according to the teaching of application Serial No. 113,853 of Dean L. Thomas for "Shaping Glass," filed May 31, 1961.

After the glass sheet has been shaped by pressurized engagement of the glass shaping members on opposite surfaces as described above, the actuating pistons then retract both glass shaping members to permit the shaped glass sheet to move rapidly from the glass shaping station 14 to a glass quenching station (not shown) and prepare the glass shaping station for receipt of the next glass sheet to be formed by press bending.

Many devices may be used to control the sequence of operation of the glass shaping members described hereinabove. For example, timing circuits may be interconnected to one another and to the actuating pistons 23 and 28 in such a manner as to provide the necessary sequence of operation.

It is not absolutely necessary that the glass shaping members be oriented so that their uppermost edge portions are tangent to the vertical plane of support for the flat glass sheets formed by press bending. In FIG. 9, an alternate embodiment shows that the complementary glass shaping members have their shaping surfaces oriented so that they are tangent to vertical planes $v_1$—$v_1$ and $v_2$—$v_2$; respectively, in horizontal plane h—h between the upper edge of the shaping surface and above the horizontal plane m—m occupied by the center of the vertical dimension of the shaping surface.

This alternate embodiment of the present invention causes the upper edge of the glass sheet to be curved into a plane at a slight angle to the vertical. Thus, there is some tendency for the tongs to distort the glass sheet in the tong gripping regions to some extent. However, this tendency to distort the upper edge of the glass is less than the tendency existing when the mold shaping surface is symmetrically arranged relative to the center of its vertical dimension. This improvement was obtained regardless of whether the opposite glass surfaces were engaged simultaneously or sequentially or whether the shaping members moved horizontally inward or obliquely upward toward the glass surfaces.

When a sheet is bent to a relatively sharp curvature about a horizontally extending axis so that the bottom edge of the bent glass sheet lies in a substantial distance outside the vertical plane of suspension of the glass sheet, the weight of the bottom portion of the glass sheet tends to impose a bending moment onto the heat-softened glass sheet that tends to straighten the sheet from a curved to a flat configuration. Therefore, it is advisable in bending glass sheets having a relatively large width dimension to be bent about a horizontal axis to compromise the amount of tilting of the glass shaping members about the axis of glass movement so as to minimize the tendency of the bent glass sheet to distort itself into a shallower bend than that desired, accepting as a penalty for this compromise a slight distortion of the glass sheet in the tong gripping regions.

In order to provide a complete disclosure, typical commercial operation exemplifying the various aspects of the present invention will be described.

The following details are supplied of a typical operation to produce curved side lights of tempered glass of nominal thickness of ¼ inch having dimensions of approximately 17 inches high and 32½ inches wide bent to a 75 inch radius of curvature about an axis extending horizontally. The innermost limit of movement of the concave glass shaping member was established by tilting the latter about a horizontal axis extending parallel to the path of movement taken by tongs suspended glass sheets through the conveyor of the bending and tempering apparatus so that the bottom edge of the concave glass shaping member contacted a vertical plane one inch beyond the plane contacted by the upper edge portion of the shaping surface. Then a strip of glass 2 inches high was suspended from tongs in the glass shaping station and the upper edge portion brought into contact with the 2 inch high strip of glass without tilting the latter.

The glass sheets were heated gradually for a period of about 4 minutes to a surface temperature of about 1225° F. During this heating phase the sheets were conveyed through a tunnel-like furnace at a constant speed. When the immediately preceding glass sheet has been shaped and the glass shaping members were being separated, the furnace exit door opened and the next sheet moved to the glass shaping station. About 4 seconds elapsed in moving the sheet to its proper position at the glass shaping station.

The concave glass shaping member contacted the bottom edge of one surface of the tongs suspended glass sheet along its bottom edge portion and moved about 1 inch past its initial line of contact. At this point the upper edge portion of the concave shaping member made contact with the upper edge of the one surface of the glass sheet. This tilted the glass sheet at an angle of slightly more than 3 degrees with respect to the vertical plane in which the glass sheet was originally suspended.

The convex glass shaping member was moved inward toward the opposite surface of the glass sheet until the shaping members were in mating relation with one another and provided pressurized contact against the opposite surfaces of the glass sheet. It took about 2 seconds for the glass shaping members to close and impress their shapes onto the opposite surfaces of the heat-softened glass sheet.

The glass shaping members were held in pressurized contact of about 1 pound per square inch against the opposite surfaces of the glass sheet for about 2 seconds and then were retracted to permit the shaped glass sheet to move toward a quenching station and to provide clearance to receive the immediately subsequent glass sheet therebetween for the necessary glass shaping operation.

Losses of glass sheets due to kinking and/or distortion during the glass shaping operation described above were less than 1 percent of those pressed. By contrast, over 30 percent of glass sheets press bent by simultaneous movement of nontilted glass shaping members toward each other to sandwich glass sheets of the same pattern were outside the tolerances required by the customer.

Each of the several aspects of the invention enumerated above improves the quality of press bent glass sheets individually. Combinations of two or more aspects produce further improvements. It is particularly desirable to combine the oblique upward and inward movement of application Serial No. 113,853 with the tilted shaping surface of either FIG. 3 or FIG. 9.

It is understood that the principles described above must be followed in modified form as the depth and complexity of bend varies, but that they are needed to produce either simple bends in which the glass is bent about a horizontal axis of bending or a compound bend wherein the glass is bent about more than one axis of bending including one having a horizontal component.

A description of certain illustrative embodiments of the present invention has been made for the purpose of illustration and many equivalent methods of operation will become obvious in the light of the present disclosure. For example, the glass sheet may be supported by supporting elements or members other than tongs during the press bending operation, such as on wires or refractory blocks that support the glass sheet along its bottom edge. The term "support" as used in this specification is meant to be generic to both bottom edge support and tong suspension. Reference to the scope of the present invention may be obtained from the claimed subject matter which follows.

What is claimed is:

1. In apparatus for shaping glass sheets by press bending, comprising a pair of opposed glass shaping members having continuous complementary convex and concave shaping surfaces of substantially continuous extent defining a shape having a component of curvature about a horizontal axis of curvature, tong means for gripping a heat-softened glass sheet between said glass shaping members in position to be sandwiched between said glass shaping members, means operatively connected to said glass shaping members to provide relative movement between said glass shaping members between a retracted position spaced from one another and a glass sandwiching position, the improvement wherein each of said shaping surfaces is tilted so that the portion of each of said complementary shaping surfaces that is tangent to a vertical plane is substantially above the horizontal plane occupied by the center of the vertical dimension of said shaping surface.

2. The improvement according to claim 1, further including means operatively connected to said glass shaping member having a convex shaping surface to move said glass shaping member having a convex shaping surface upwardly and simultaneously inwardly toward said glass shaping member having a concave shaping surface.

3. The improvement according to claim 1, wherein the uppermost portion of said shaping surface is tangent to a vertical plane.

4. The improvement according to claim 3, further including means operatively connected to said glass shaping member having a convex shaping surface to move said glass shaping member having a convex shaping surface upwardly and simultaneously inwardly toward said glass shaping member having a concave shaping surface.

References Cited by the Examiner
UNITED STATES PATENTS 2,251,159  7/1941  Owen _____ 65—104
3,136,618  6/1964  Valchar et al. _____ 65—106

DONALL H. SYLVESTER, *Primary Examiner.*

A. D. KELLOGG, *Assistant Examiner.*